(12) United States Patent
Brueckner et al.

(10) Patent No.: US 7,360,002 B2
(45) Date of Patent: Apr. 15, 2008

(54) METHOD OF ARBITRATING ACCESS TO A DATA BUS

(75) Inventors: Dieter Brueckner, Unterleiterbach (DE); Franz-Josef Goetz, Heideck (DE); Dieter Klotz, Fuerth (DE); Juergen Schimmer, Nuremberg (DE); Matthias Schweikart, Erlangen (DE)

(73) Assignee: Siemens AG, Munich (DE)

( * ) Notice: Subject to any disclaimer, the term of this patent is extended or adjusted under 35 U.S.C. 154(b) by 862 days.

(21) Appl. No.: 10/809,852

(22) Filed: Mar. 26, 2004

(65) Prior Publication Data

US 2004/0252682 A1    Dec. 16, 2004

Related U.S. Application Data

(63) Continuation of application No. PCT/DE02/03436, filed on Sep. 13, 2002.

(30) Foreign Application Priority Data

Sep. 26, 2001   (DE) ............................. 101 47 437
Jul. 26, 2002   (DE) ............................. 102 34 145

(51) Int. Cl.
    *G06F 13/368*   (2006.01)
(52) U.S. Cl. .................................... 710/120
(58) Field of Classification Search ........ 710/119–125, 710/242; 370/452–456
    See application file for complete search history.

(56) References Cited

U.S. PATENT DOCUMENTS

| | | | |
|---|---|---|---|
| 3,983,540 A * | 9/1976 | Keller et al. ................ 710/121 |
| 4,395,753 A | 7/1983 | Comfort et al. | |
| 4,730,268 A | 3/1988 | Marin | |
| 5,481,676 A * | 1/1996 | Glaeser et al. .............. 710/107 |
| 5,912,889 A * | 6/1999 | Preas et al. .................. 370/359 |
| 5,948,089 A * | 9/1999 | Wingard et al. ............ 710/107 |
| 6,272,580 B1 | 8/2001 | Stevens et al. | |
| 6,459,704 B1 * | 10/2002 | Jandrell ...................... 370/445 |

FOREIGN PATENT DOCUMENTS

WO   WO 98/12645 A1   3/1998

OTHER PUBLICATIONS

"One-Bit Token Ring Arbitration Protocol/Scheme" IBM Technical Disclosure Bulletin, IBM Corp., vol. 33, No. 2, Jul. 1990, pp. 325-331, New York.

* cited by examiner

*Primary Examiner*—Paul R. Myers
(74) *Attorney, Agent, or Firm*—Sughrue Mion, PLLC

(57) ABSTRACT

A method for arbitrating access to a data bus among subscribers or bus devices (Tn 1,Tn 2, . . . ), wherein the bus devices are coupled by at least one arbitration ring (12; 38, 40, 42, 44, 46, 48). The method comprises the following steps: a) requesting access by a first bus device; b) checking whether a first signal, which indicates that the arbitration ring is enabled, is present at an input (16) of the first bus device; c) if the first signal is present, outputting (18) a second signal by the first bus device; d) checking whether, at the end of a predetermined time period, the first signal is still present at the input (16) of the first bus device; and e) if the first signal is still present at the end of the predetermined time period, accessing the data bus by the first bus device.

9 Claims, 19 Drawing Sheets

METHOD OF ARBITRATING ACCESS TO A DATA BUS

This is a Continuation of International Application PCT/DE02/03436, with an international filing date of Sep. 13, 2002, which was published under PCT Article 21(2) in German, and the disclosure of which is incorporated into this application by reference.

FIELD OF AND BACKGROUND OF THE INVENTION

This invention relates to a method of arbitrating access to a data bus, wherein the bus devices are linked by at least one arbitration ring. The invention also relates to a corresponding bus device and to a communication system.

A synchronous, clocked communication system having equidistant properties is a system of at least two subscribers or bus devices that are interconnected via a data network for the purpose of mutual data exchange and/or data transmission. The data exchange occurs cyclically in equidistant communication cycles that are predetermined by the communication clock pulse of the system. The bus devices include, for example, central automation equipment; programming devices; planning and design devices or operator devices; peripheral devices such as input/output modules, drives, actuators, and sensors; and programmable controllers or other control units, computers or machines that exchange electronic data with other machines and, in particular, process data from other machines. Bus devices are also known as network nodes or simply nodes. Hereinafter, the term "control units" refers to regulating units and control units of all types, but also, for example, to switches and/or switch controllers. The data networks include, for example, bus systems such as field bus, Profibus, Ethernet, Industrial Ethernet, FireWire or PC-internal bus systems (PCI), etc., in particular isochronous real-time Ethernet.

Data networks permit communication among a plurality of bus devices through networking, i.e., through interconnecting individual bus devices. Therein, the term "communication" refers to the transmission of data between the bus devices. The data to be transmitted is sent in the form of data telegrams, i.e., the data is bundled into multiple packets and sent, in this form, over the data network to the respective receiver. These packets are therefore also known as data packets. The term "data transmission" is used herein as being completely synonymous with the above-mentioned transmission of data telegrams or data packets.

In distributed automation systems, e.g., in the field of drive technology, certain data must arrive at certain times at the intended bus devices and be processed by the recipients. This is called real-time-critical data and/or data traffic because, if the data does not arrive at the destination in time, unwanted results occur at the bus device.

This is in contrast to data communication that is not real-time critical, e.g., Internet-based or Intranet-based data communication. According to IEC 61491, EN 61491, SERCOS interface—Brief Technical Description (http://www.sercos.de/pdf/sercos_kurzbeschreibung_de_2002.pdf), successful real-time-critical data traffic of the above-mentioned type is ensured in distributed automation systems.

Today, automation components (e.g., controls, drives, . . . ) generally have an interface to a cyclically clocked communication system. An operation level of the automation component (fast cycle) (e.g., position regulation in a control, torque regulation of a drive) is synchronized with the communication cycle. This defines the communication clock pulse. Other, low-performing algorithms (slow cycle) (e.g., temperature regulations) of the automation components may also communicate with other components (e.g., binary switches for fans, pumps, . . . ) only via this communication clock pulse, although a slower cycle would be sufficient. Due to using only one communication clock pulse for transmitting all information in the system, there are high demands on the bandwidth of the transmission link.

The related art discloses various centralized and decentralized arbitration methods for accessing a data bus. In the centralized arbitration method, a central arbiter decides which of the bus devices that have made an access request will access the bus. An example of a centralized arbitration method is the Round-Robin algorithm.

In the decentralized arbitration method, the bus arbitration is performed decentrally in each bus device. An example of such a method is the Daisy-Chain algorithm.

OBJECTS OF THE INVENTION

Objects of this invention include providing an improved arbitration method, an improved bus device, and a communication system.

SUMMARY OF THE INVENTION

According to one formulation of the invention, these and other objects are achieved by a method of arbitrating access to a data bus among bus devices, wherein the bus devices are linked by a plurality of arbitration rings. The method includes requesting access by a first bus device; checking whether a first signal, which indicates that one of the arbitration rings is enabled, is applied to an input of the first bus device; if the first signal is applied, outputting a second signal by the first bus device; checking whether, at the end of a predetermined time interval, the first signal is still applied at the input of the first bus device; and, if the first signal is still applied at the end of the predetermined time interval, accessing the data bus by the first bus device. A respective priority is assigned to each of the arbitration rings.

The invention makes it possible to create a communication system, in which the number of arbitration rings is independent of the number of bus devices. Thus, the corresponding arbitration method functions independently of the number of bus devices and is, therefore, in principle, arbitrarily scalable. Therein, a maximum delay time, the so-called latency time, for accessing the bus can be guaranteed.

According to a preferred embodiment of this invention, access requests of different priorities are supported by providing a separate arbitration ring for each of the possible priorities.

According to another preferred embodiment of this invention
one arbitration unit is assigned to each bus device,
each arbitration unit of a bus device supports two priorities LP and HP, for example, wherein LP denotes the low-priority and HP denotes the high-priority.

According to another preferred embodiment of this invention, in the case of two supported priorities, the arbitration units of the bus devices are combined to form a low-priority ring and a high-priority ring. Therein, it is advantageous that the arbitration unit of a bus device is able to interrupt the low-priority ring so that there is no combinatory feedback. This bus device is the low-priority ring master.

According to another preferred embodiment of this invention the low-priority ring master is always the current bus master, which is able to execute write and read accesses via the bus, each bus device can become the low-priority ring master and, thus, the bus master, a bus device becomes the new low-priority ring master
if the low-priority bus request is activated with this bus device, and
the current bus master is ready to relinquish its bus access right, and
there is no other low-priority bus request of a bus device between the old low-priority ring master and the new low-priority ring master, the arbitration unit of a bus device must always interrupt the high-priority ring, so that there is no combinatory feedback; this bus device is the high-priority ring master, each bus device can become the high-priority ring master, a bus device, which, as the bus master, executes high-priority write and read accesses, must be both low-priority ring master and high-priority ring master, a bus device, which, as the bus master, executes low-priority write and read accesses, must be the low-priority ring master;

a high-priority ring master is ready to change masters on the high-priority ring, if
no high-priority bus request is applied at this bus device, or
a high-priority bus request is applied and this bus device is already the bus master.

If one of the above-mentioned two conditions is met, then, at the output of the arbitration unit of the high-priority ring master, the signal level for "HP ring enabled" is output on the high-priority ring.

If, at the input of its arbitration unit, the high-priority ring master receives the signal level "HP ring enabled", which it had previously output on the high-priority ring at the output of its arbitration unit, then no other bus device made a high-priority bus request. In this case, there is no changing of masters on the high-priority ring.

Neither of the two conditions is met, if, despite an activated high-priority bus request, the high-priority ring master is not the bus master. In this case, the signal level for "HP ring occupied" is output on the high-priority ring at the output of the arbitration unit of the high-priority ring master.

According to another preferred embodiment of this invention starting with the next bus clock pulse, a bus device becomes the new high-priority ring master if the following conditions are met:
the high-priority bus request must be activated,
the signal level for "HP ring enabled" must be applied at the input of its arbitration unit.

So that, in the current bus clock pulse, these conditions are not met even at other bus devices, and so that there is only one high-priority ring master, this bus device outputs, at the output of its arbitration unit, the signal level for "HP ring occupied" on the high-priority ring. This signal level remains activated until the new high-priority ring master is ready for changing masters on the high-priority ring and switches to the signal level for "HP ring enabled" on the high-priority ring.

If, after initializing the bus system, a bus device is the default bus master and the default high-priority ring master, then the maximum time for accessing the bus may be parameterized in each arbitration unit.

There is also a default bus clock pulse. A bus master may relinquish its bus access right again at any time before the maximum access time has elapsed. If another bus device has made a bus request (low- or high-priority), then the arbitration unit of the current bus master enables the bus access right again, at the latest after the maximum access time has elapsed. Once the maximum access time has elapsed, this changing of masters occurs even if the bus request is still set at the previous bus master. As long as no other bus device has made a bus request (low- or high-priority), the current bus master retains the bus access right even after the maximum access time has elapsed.

According to another preferred embodiment of this invention, a pause time is parameterized in each arbitration unit. This pause time must elapse before a bus master, after surrendering its bus access right, can become the bus master again. In addition, there is a default bus clock pulse. This pause time is also maintained when the bus device has made a low-priority or high-priority bus request to its arbitration unit.

According to another preferred embodiment of this invention, the following arbitration sequence occurs when there are two supported priorities:

as long as the current bus master wants to retain its bus access right, the arbitration unit of the bus master activates "bus occupied" (e.g., a logic 0) on the low-priority ring, if the current bus master is ready to surrender its bus access right, then its arbitration unit activates "bus enabled" (e.g., a logic 1) on the low-priority ring, in order for a bus device, which has made a low-priority bus request to its arbitration unit, to become the new bus master, the following conditions must be met:
the signal level for "HP ring enabled" must be applied to the high-priority input of its arbitration unit,
the signal level for "bus enabled" must be applied to the low-priority input of its arbitration unit,
the parameterized pause time between release of the bus access right and renewed receipt of the bus access right must have elapsed.

If all these conditions are met, starting with the next bus clock pulse, this bus device becomes the new bus master. So that, in the current clock pulse, these conditions are not met even at other bus devices, and so that there is only one bus master, this bus device outputs, at the output of its arbitration unit, the signal level for "bus occupied" on the low-priority ring. This signal level remains activated until the new bus master is ready to surrender the bus access right again and switches to the signal level for "bus enabled" on the low-priority ring.

If a bus master receives, at the input of its arbitration unit, the signal level "bus enabled" again, which it had previously output on the low-priority ring at the output of its arbitration unit, the conditions for changing masters on the bus are not met by any bus devices in the current bus clock pulse. In this case, the current bus master retains its bus access right and can execute additional write or read accesses to the jointly utilized resources, until another bus device makes a bus request.

The following conditions must be met in order for a bus device, which has made a high-priority bus request to its arbitration unit, to be the new bus master:
the bus device must be the high-priority ring master,
the signal level for "bus enabled" must be applied to the low-priority input of its arbitration unit, the parameterized pause time must have elapsed between relinquishment and renewed receipt of the bus access right.

If all these conditions are met, starting with the next bus clock pulse, this bus device becomes the new bus master. In this method, since the arbitration units of the bus devices form a ring, equal treatment of the bus devices and a maximum delay time from bus request to bus allocation are ensured.

If additional priorities are required, another priority ring is necessary for each additional priority. Otherwise, the above statements still apply, with the following generalization:

The following conditions must be met in order for a bus device, which has made a bus request of a given priority N to its arbitration unit, to be the new bus master:

the signal level for "ring enabled" must be applied to each of the higher-priority inputs of its arbitration unit, the bus device must be the ring master of this priority level N, the signal level for "bus enabled" must be applied to the low-priority input of its arbitration unit, the parameterized pause time between relinquishing and renewed receipt of the bus access right must have elapsed.

If all these conditions are met, starting with the next clock pulse, this bus device becomes the new bus master.

This method meets all the requirements of a powerful arbitration method, while, at the same time, the planning and design complexity is minimal.

In particular, this arbitration method can be used in the field bus area in the case of real-time Ethernet communication.

In addition, it is particularly advantageous that the disclosed methods can be used in automation systems, in particular in and at packaging machines, presses, plastic injection molding machines, textile machines, printing machines, machine tools, robots, handling systems, wood processing machines, glass processing machines, ceramic processing machines and hoisting gear.

BRIEF DESCRIPTION OF THE DRAWINGS

Exemplary embodiments of this invention are explained below with reference to the drawings, in which.

DETAILED DESCRIPTION OF THE PREFERRED EMBODIMENTS

Figure 1:
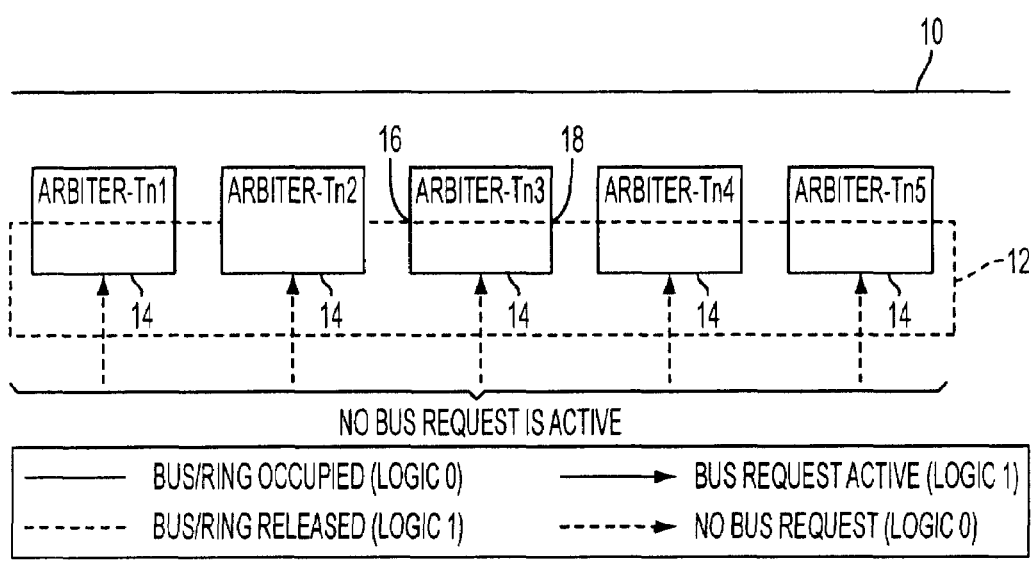
FIG. 1 shows arbitration with a priority status after reset, wherein bus device 2 is the bus master.

FIG. 1 shows a block diagram of a communication system according to the invention. The communication system includes a data bus 10 to which bus devices Tn 1, Tn 2, Tn 3, Tn 4 and Tn 5 of the communication system gain access. The bus devices Tn 1 through Tn 5 are linked by an arbitration ring 12. In this exemplary embodiment, the arbitration ring 12 has a clockwise direction.

FIG. 1 shows the state after a reset: the bus device Tn 2 is the bus master and the ring master as long as no access request, i.e., a so-called bus request, is activated. A bus request is generated, for example, by an application of a bus device. Hereinafter, the term "bus master" refers to the bus device that accesses the data bus 10.

Each of the bus devices Tn 1 through Tn 5 has an arbitration module 14 with an input 16 and an output 18. The signal "bus/ring occupied" or "bus/ring enabled" is received at the input 16. Generally, the signal at the input 16 is output at the output 18 without change.

Only if a bus device has the role of a ring master for the arbitration ring 12 is this bus device, with the signal "bus/ring occupied" at its input 16, able to output the signal "bus/ring enabled" at its output 18. In the exemplary embodiment, the bus master and the ring master are identical because there is only one arbitration ring 12, and the bus device Tn 2 is the bus master and the ring master.

Figure 2:
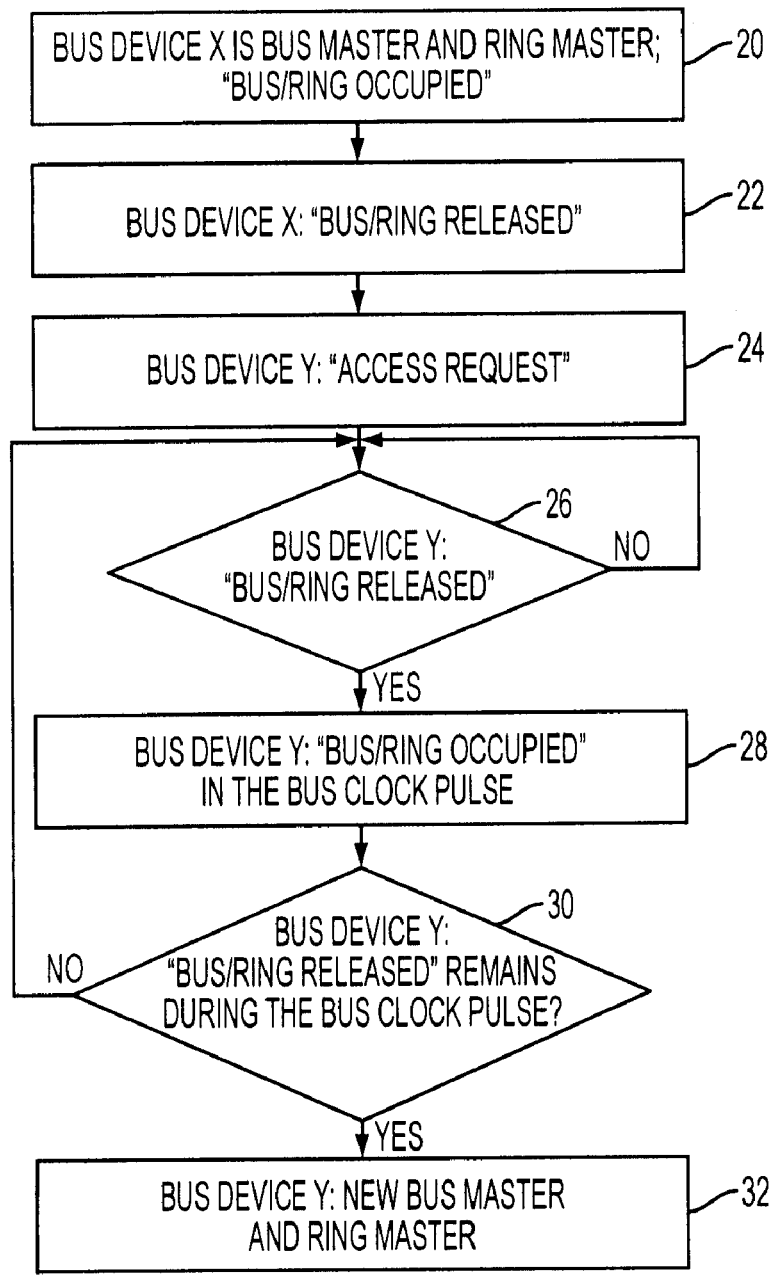
FIG. 2 shows a flow chart of an exemplary embodiment of the method according to the invention with a priority.

The flow chart in FIG. 2 illustrates the operation of the communications system shown in FIG. 1. In step 20, one of the bus devices Tn X is the bus master and, at the same time, the ring master. The bus device Tn X has current access to the data bus 10, so that the signal "bus/ring occupied" is circulating on the arbitration ring 12.

In step 22, the bus device Tn X would like to enable the data bus 10. The reason for this may be that the bus device Tn X no longer has a bus request or that a predetermined maximum period of time for occupancy of the data bus has elapsed. Since the bus device Tn X is the ring master, it can output the signal "bus/ring enabled" at its output 18, which takes place in step 22.

In step 24, another bus device Tn Y has an access request. The access request may come from an application of the bus device Tn Y. In step 26, the bus device Tn Y checks on whether the signal "bus/ring enabled" is applied at its input 16. If this is not the case, the bus device Tn Y must wait until this signal is applied at its input 16.

In step 28, as soon as the signal "bus/ring enabled" is applied at the input 16 of the bus device Tn Y, the bus device Tn Y outputs the signal "bus/ring occupied" at its output 18. This is done at the beginning of a bus clock pulse, for example.

In step 30, the bus device Tn Y checks on whether the signal "bus/ring enabled" is still applied at its input 16 at the end of the bus clock pulse. If this is the case, this means that either no other bus device has output a signal "bus/ring occupied" to the arbitration ring 12 after the signal "bus/ring enabled" was applied, or another bus device has output such a signal "bus/ring occupied" but this bus device is at a greater distance from the current ring master in the clockwise direction of the arbitration ring 12 than is the bus device Tn Y. Advantageously, the length of the bus clock pulse is selected to be essentially equal to the length of the revolution of a signal around the arbitration ring 12 or longer.

In step 32, if the condition of step 30 is met, the bus device Tn Y is the new bus master and, simultaneously, the new ring master for the arbitration ring 12. If the condition of step 30 is not met, then the sequence control of the bus device Tn Y goes back to step 26.

Figure 3:
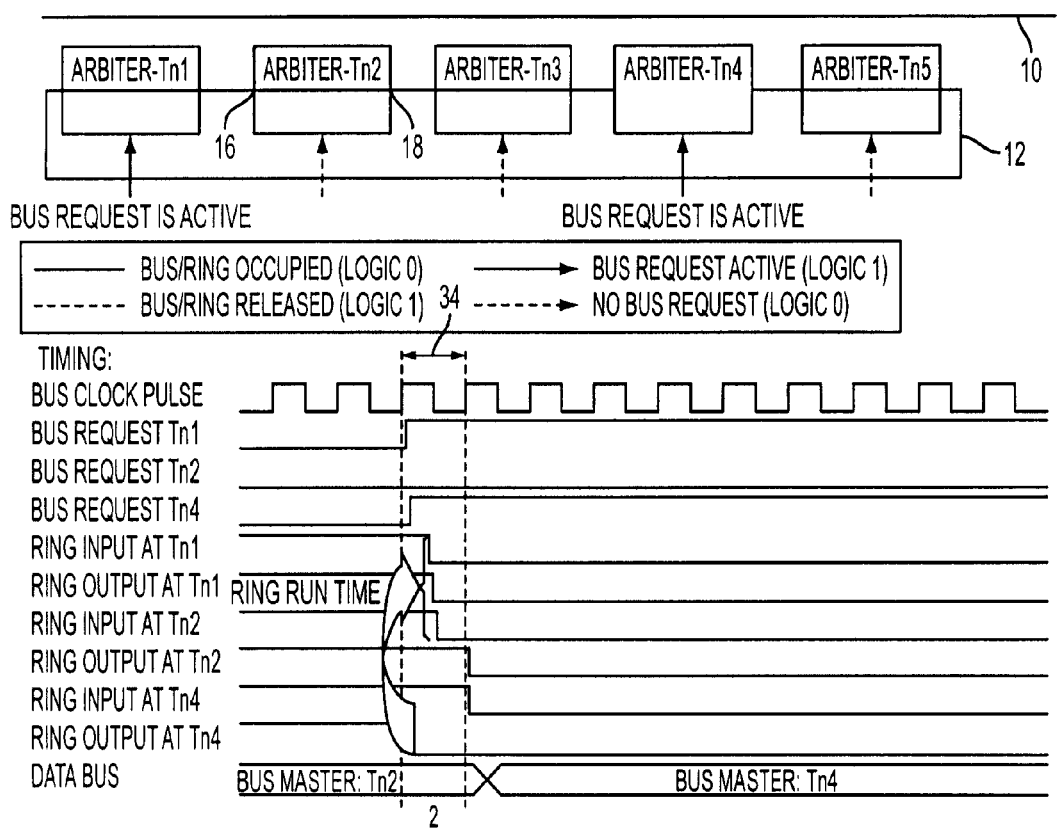
FIG. 3 shows arbitration with a priority and a timing diagram—bus devices 1 and 4 activate a bus request, wherein bus device 4 becomes the bus master.

FIG. 3 shows a corresponding timing diagram. At first, the bus device Tn 2 is both the bus master and the ring master of the arbitration ring 12. The ring output at the output 18 of the bus device Tn 2 is at logic 1, i.e., "bus/ring enabled." At the beginning of the bus clock pulse 34, the bus device Tn 1 receives a request to access the data bus 10, i.e., the signal Busreq_Tn 1 switches from logic 0 to logic 1. Likewise, the bus device Tn 4 receives a request to access the data bus 10, so the signal Busreq_Tn 4 switches from logic 0 to logic 1.

Since the signal "bus/ring enabled" circulates on the arbitration ring 12 and the bus device Tn 1 receives this signal at its input 16, the bus device Tn 1 then delivers the signal "bus/ring occupied" at its output 18, i.e., at its ring output. The same is true for the bus device Tn 4.

The signals "bus/ring occupied" output by the bus devices Tn 1 and Tn 4 then begin to propagate clockwise through the arbitration ring 12 via the individual bus devices. At the end of the bus clock pulse 34, the bus devices Tn 1 and Tn 4 check their respective inputs 16 on whether the signal at the inputs 16 is still "bus/ring enabled."

This is the case for the bus device Tn 4, because, in the clockwise direction, the bus device Tn 4 is situated closer to the still current ring master Tn 2 in the arbitration ring 12. At the input 16 of the bus device Tn 1, however, the signal "bus/ring occupied" is already applied. Because of this, the bus device Tn 4 becomes the new bus master and, simultaneously, the new ring master of the arbitration ring 12 so that the bus device Tn 4 can access the data bus 10.

Figure 4:
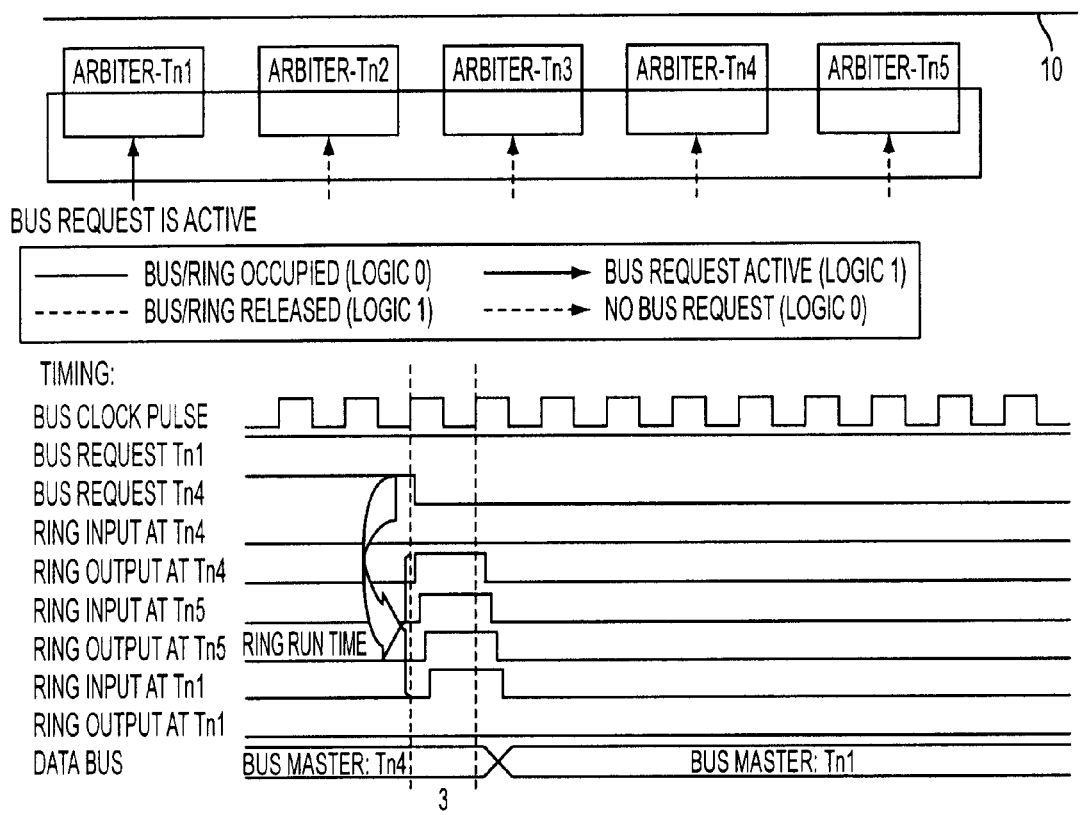
FIG. 4 shows arbitration with a priority and a timing diagram—bus device 4 deactivates the bus request, wherein bus device 1 becomes the bus master.

FIG. 4 shows a situation in which the bus device Tn 4 has deactivated its bus request, i.e., in which the bus device Tn 4, at its output 16, has switched from "bus/ring occupied" back to "bus/ring enabled." Thus, after the bus device Tn 4 has processed its access request or after the maximum access time has elapsed, it is now the bus device's Tn 1 turn to become the new bus master and ring master.

Figure 5:
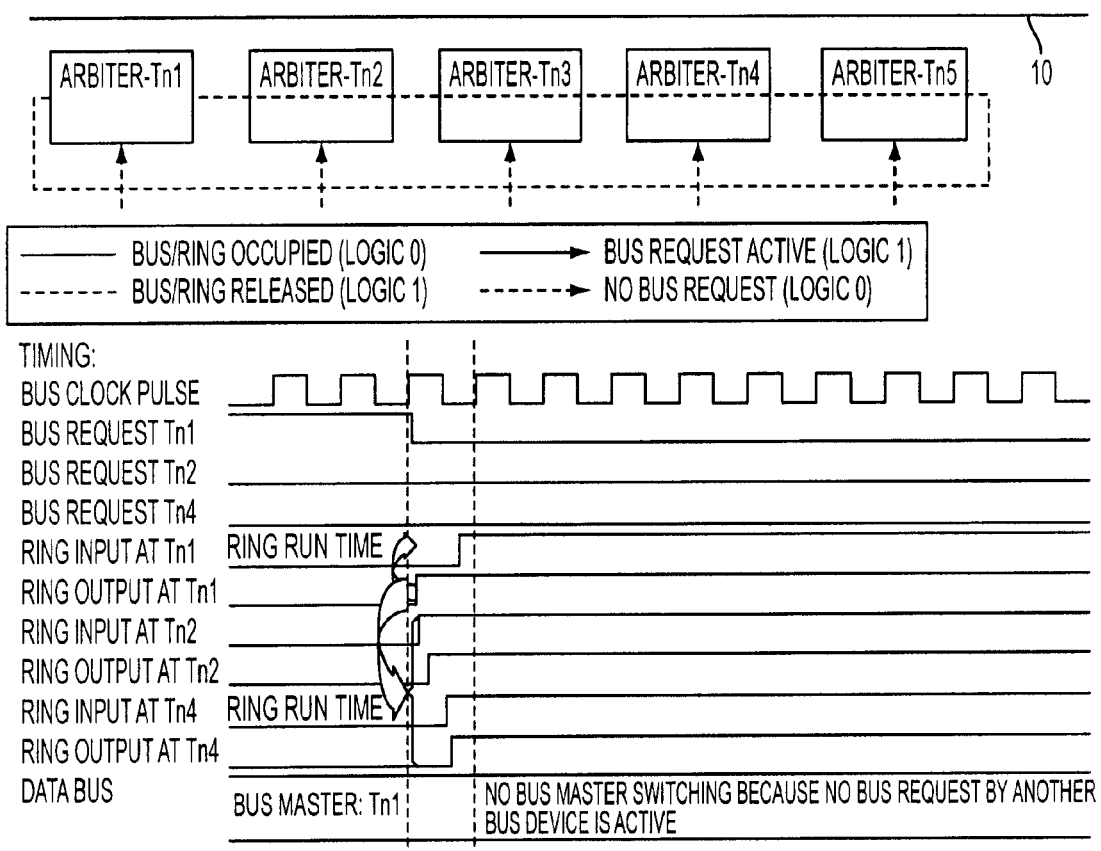
FIG. 5 shows arbitration with a priority and a timing diagram—bus device 1 deactivates the bus request and remains the bus master.

FIG. 5 shows a situation in which the bus master Tn 1 has deactivated its bus request and, for the time being, remains the bus master and ring master because no bus request from another bus device is active.

Figure 6:
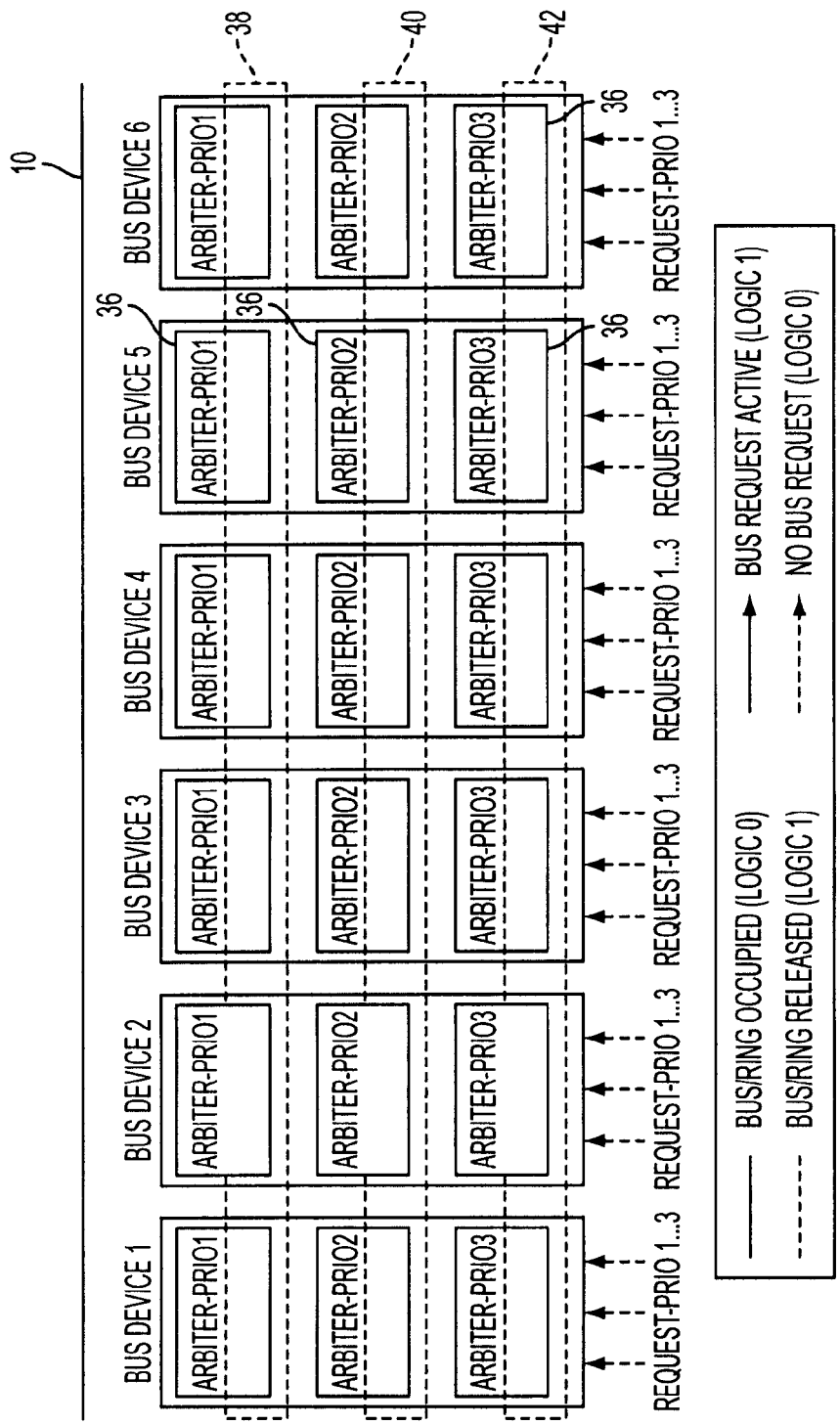
FIG. 6 shows arbitration with three priorities after reset, wherein bus device 2 is the bus master.

FIG. 6 shows an alternative embodiment of a communication system according to the invention that has a plurality of arbitration rings.

The communication system includes the bus devices or bus devices 1, 2, 3, 4, 5 and 6 and the data bus 10. The bus devices 1 through 6 have arbitration modules 36 which are interlinked by arbitration rings 38, 40 and 42. The arbitration ring 38 processes access requests for the bus 10 with the highest priority 1. Analogously, the arbitration ring 40 is used for access requests of the priority 2, and the arbitration ring 42 is used for access requests of the priority 3.

FIG. 6 shows the status of this communication system after a reset, wherein the bus device 2 is the bus master and, simultaneously, the ring master of the arbitration rings 38, 40 and 42.

Figure 7:
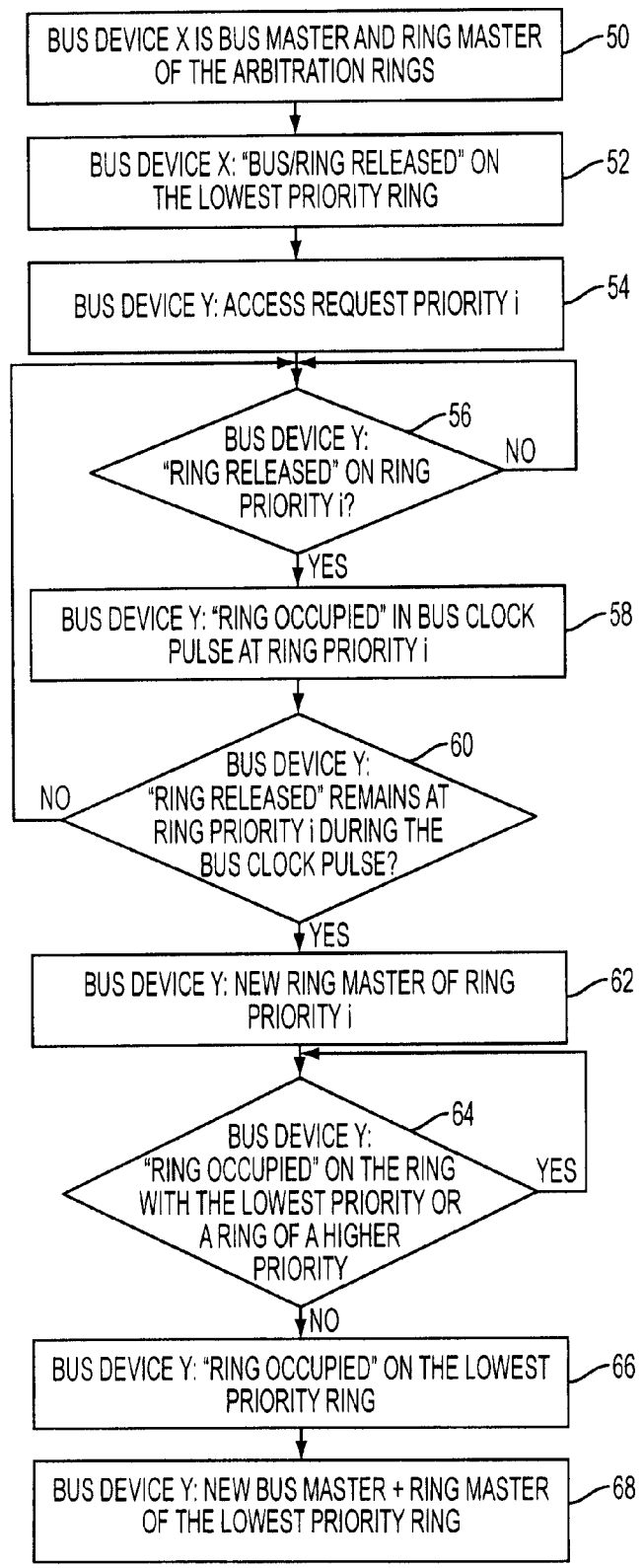
FIG. 7 shows an exemplary embodiment of the method according to the invention having multiple priorities.

The flow chart in FIG. 7 illustrates the operation of a communication system of the type depicted in FIG. 6, which has a number N of priorities and a number N of arbitration rings.

In step 50, one of the bus devices X of the communication system is the bus master and ring master of the arbitration rings. This is the initial state after a reset. In step 52, the bus device X applies the signal "bus/ring enabled" to the lowest priority ring of the communication system, i.e., in the exemplary embodiment depicted in FIG. 6, to the arbitration ring 42. This corresponds to step 22 of the exemplary embodiment of FIG. 2.

In step 54, the bus device Y of the communication system has an access request to the data bus 10 with the priority i, where $1 \leq i \leq N$. This step corresponds to step 24 in the exemplary embodiment of FIG. 2.

In step 56, the bus device Y checks on whether the signal "ring enabled" on the arbitration ring, which is assigned the priority i, is applied to the input of the bus device Y If this is not the case, the bus device Y must wait until this condition is met.

However, if this condition is met, the bus device Y outputs the signal "ring occupied", at its output, to the arbitration ring of the priority i, e.g., at the beginning of a bus clock pulse.

In step 60, the bus device Y checks on whether, at the end of the bus clock pulse, the signal "ring enabled" is still applied at the input of the bus device Y for the arbitration ring of the priority i. If this is not the case, the sequence control of the bus device Y goes back to step 56.

If this condition is met, then step 62 is executed. Steps 56, 58 and 60 correspond to steps 26, 28 and 30 in the exemplary embodiment according to FIG. 2, wherein the arbitration ring, which is assigned the priority i, replaces the single arbitration ring 12 (see FIG. 1).

In step 62, the bus device Y becomes the new ring master of the arbitration ring of the priority i. However, the bus device Y has not yet become the bus master.

To do so, the bus device Y must first check in step 64 whether, on the arbitration ring with the lowest priority N or on an arbitration ring with a priority greater than the priority i, the signal "ring occupied" is applied to one of the arbitration ring inputs of the bus device Y. If this is the case, then the bus device Y must wait until the signal "ring occupied" has been replaced by "ring enabled."

Then, in step 66, the bus device Y will output the signal "ring occupied" on the lowest-priority ring so as to become the new bus master and ring master of the lowest-priority ring in step 68.

Figure 8:
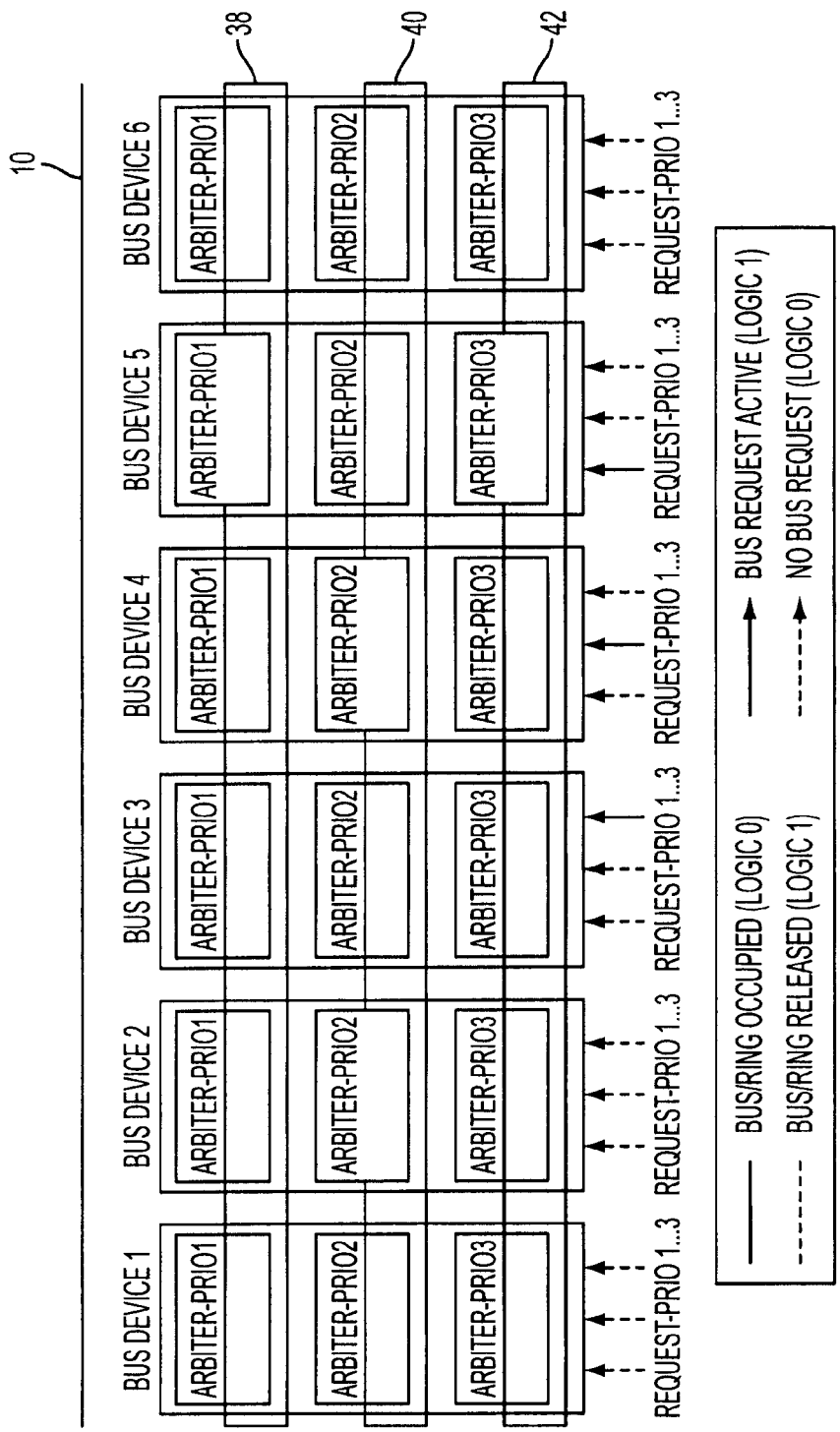
FIG. 8 shows arbitration with three priorities, wherein bus devices 3, 4 and 5 activate bus requests of different priorities, and wherein bus device 5 becomes the bus master.

FIG. 8 shows the state of the communication system of FIG. 6 when, for the time being, the bus device 2 is the bus master, the bus device 3 has an access request to the data bus 10 with the priority 3 ("request of the priority 3"), the bus device 4 has a request of the priority 2, and the bus device 5 has a request of the priority 1. In this situation, the bus device 5 becomes the new ring master of the arbitration ring 38 of the priority 1. The bus device 4 becomes the new ring master of the arbitration ring 40 of the priority 2 and the bus device 5 becomes the new ring master of the arbitration ring 42 of the priority 3, although a request of the priority 3 is active at the bus device 3.

The bus device 3 could become the new ring master of the priority 3, only if no access request having a higher priority is active. Thereafter, the bus device that has made the bus request having the highest priority always becomes the ring master of the priority 3. At the same time, each ring master of the priority 3 is also the data bus master. Therefore, the bus device 5 becomes the new bus master.

Figure 9:
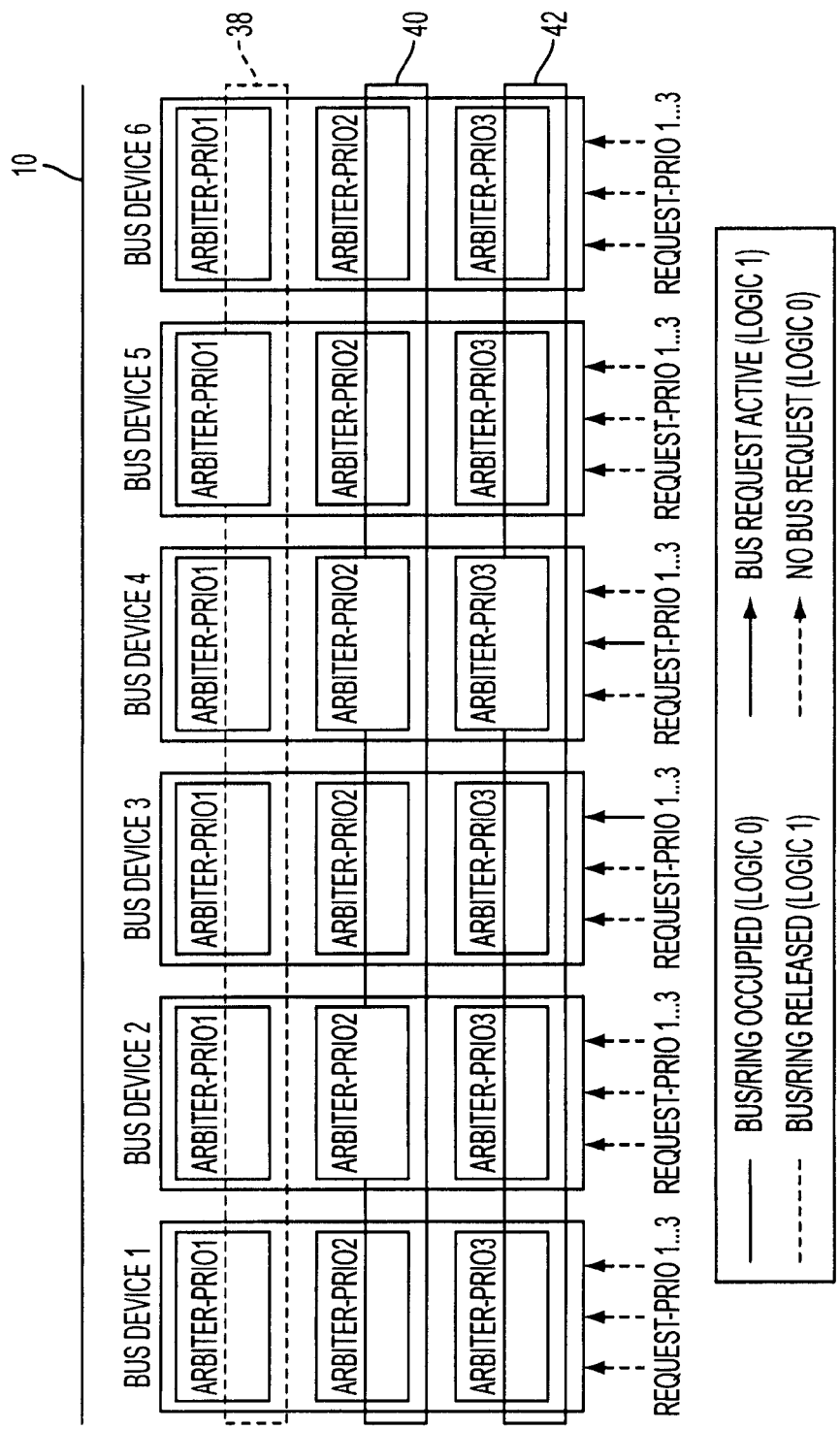
FIG. 9 shows arbitration with three priorities, wherein bus device 5 deactivates the bus request, and wherein bus device 4 becomes the bus master.

FIG. 9 shows the state of the communication system starting from the state in FIG. 8, in which the bus device 5 is the bus master. The bus device 5 deactivates its request of the priority 1, wherein the bus device 3 has a request of the priority 3 and the bus device 4 has a request of the priority 2. In this case, the bus device 5 remains the ring master of the arbitration ring 38 of the priority 1, because no other bus device has activated an access request of the priority 1 to the data bus 10. Furthermore, the bus device 4 remains the ring master of the arbitration ring 40 of the priority 2 and becomes the new ring master of the arbitration ring 42 of the priority 3, although a request of the priority 3 is active at the bus device 3.

The bus device 3 could become the new ring master of the priority 3, only if no request of a higher priority is active. In this method, the bus device that has made the bus request having the highest priority always becomes the ring master of the priority 3. Each ring master of the priority 3 is also the data bus master. Therefore, the bus device 4 now becomes the new bus master.

Figure 10:
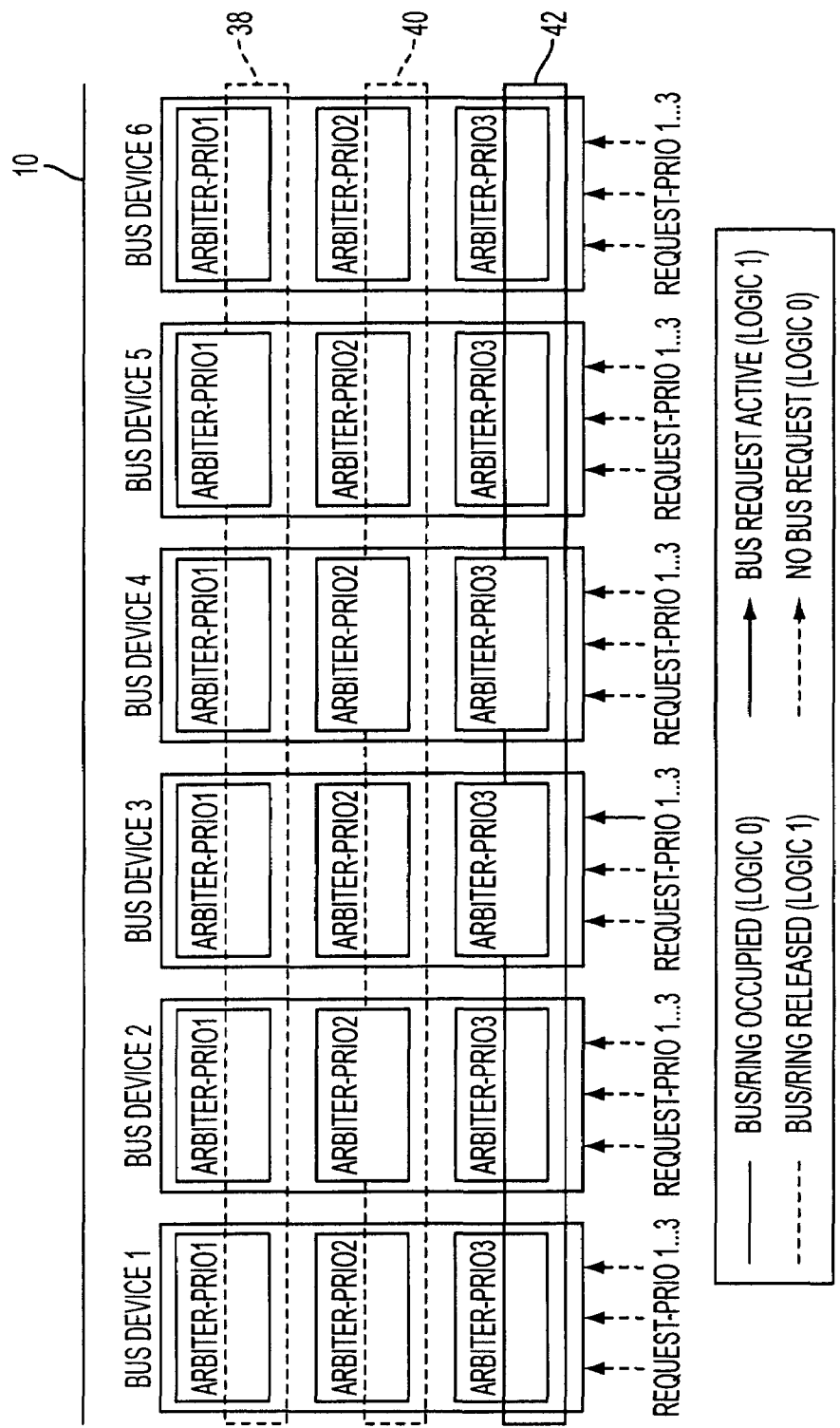
FIG. 10 shows arbitration with three priorities, wherein bus device 4 deactivates the bus request, and wherein bus device 3 becomes the bus master.

FIG. 10 shows the state of the communication system, wherein the bus device 4 is the old bus master. This bus device deactivates its request of the priority 2. The bus device 3 has a request of the priority 3. In this situation, the bus device 5 remains the ring master of the arbitration ring 38 of the priority 1, because no other bus device has activated a request of the priority 1. The bus device 4 remains the ring master of the arbitration ring 40 of the priority 2, because no other bus device has activated a request of the priority 2. The bus device becomes the new ring master of the arbitration ring 42 of the priority 3, because no request of a higher priority is active.

In this method, the bus device that has made the bus request with the highest priority always becomes the ring master of the priority 3. Each ring master of the priority 3 is also the data bus master. Therefore, the bus device 3 now becomes the new bus master.

Figure 11:
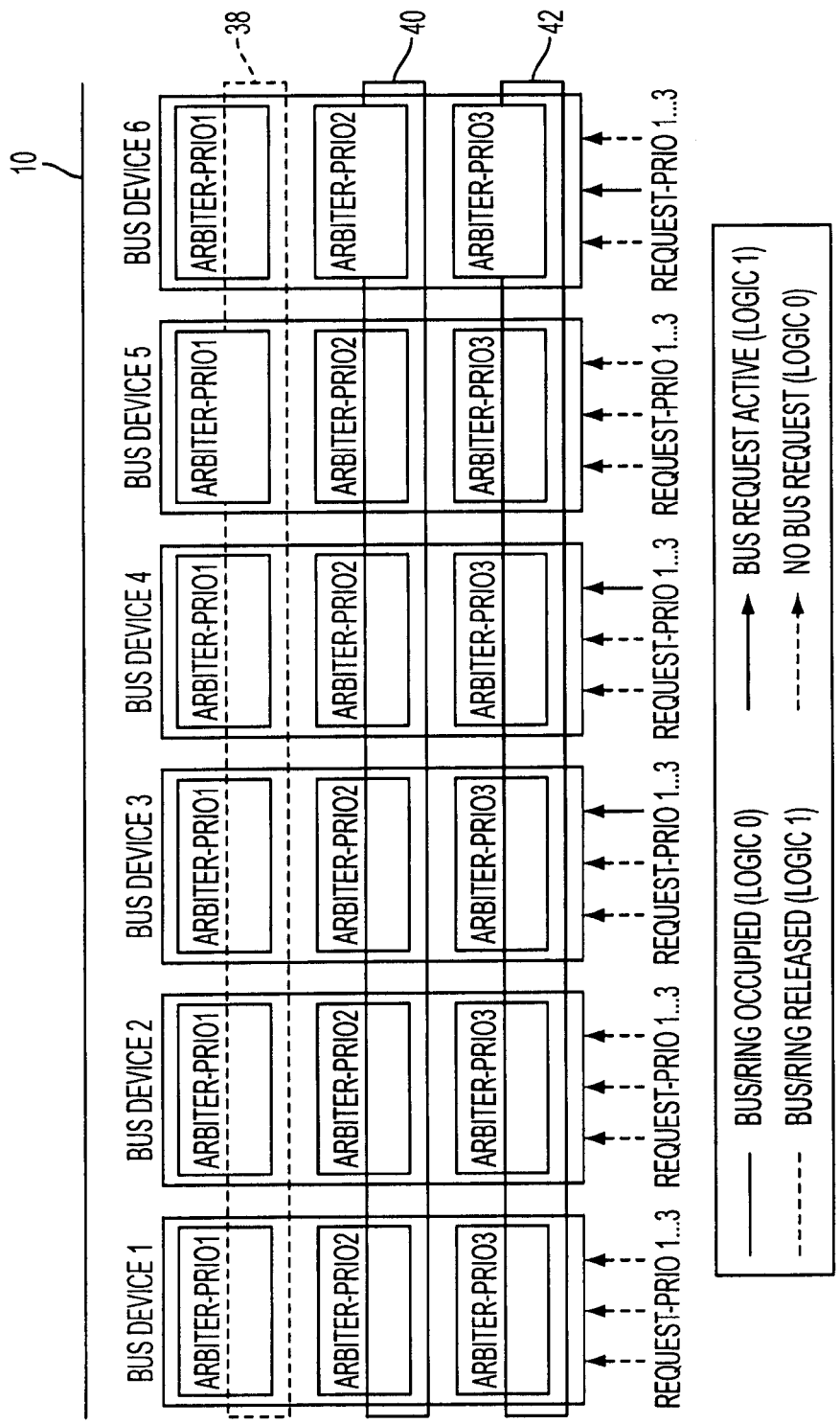
FIG. 11 shows arbitration with three priorities, wherein bus devices 4 and 6 activate bus requests of different priorities, wherein bus device 3 deactivates the bus request, and wherein bus device 6 becomes the bus master.

FIG. 11 shows the state of the communication system, in which the bus device 4 has activated a request of the priority 3 and the bus device 6 has activated its request of the priority 2. In this situation, the bus device 6 immediately becomes the new ring master of the arbitration ring of the priority 2. This is independent of the point in time at which the previous bus master, i.e., the bus device 3, has deactivated its bus request.

However, at the earliest, the bus device 6 can become the bus master when the previous bus master, i.e., the bus device 3, has deactivated the bus request. Therein, the priority of the bus request by the bus master is unimportant.

As soon as the current bus master, namely the bus device 3, has deactivated the request of the priority 3, the bus device 6 becomes the new ring master of the priority 3 and, thus, becomes the new bus master.

Despite the activated request of the priority 3, the bus device 4 does not become the ring master of the priority 3 because a request of a higher priority is active. Since the previous bus master, namely the bus device 3, has deactivated its bus request, the situation shown in FIG. 11 occurs.

However, if the bus device 2, for example, activates the request of the priority 3 before the current bus master, i.e., the bus device 6, is ready to relinquish the bus (i.e., to deactivate its bus request), the bus device 2 becomes the new ring master of the priority 3 and, thus, the new bus master when the bus device 6 deactivates the bus request and no higher-priority request of another bus device has been activated at this point in time. The bus device 4 activated its bus request of the priority 3 earlier than the bus device 2, but the bus device 4 was skipped when the bus masters was changed from the bus device 3 to the bus device 6.

For example, if the bus device 5 activates a bus request of the priority 1 or a bus request of the priority 2 before the current bus master, the bus device 2, is ready to relinquish the bus, then the bus device 4 is again not taken into account at the next bus master change. The reason that a bus device that activates the lowest-priority bus request is not taken into account when changing bus masters lies in the fact that, in this method, the ring master of this lowest priority is always the bus master.

To avoid this disadvantage, i.e., to avoid failing to take a bus device into account when switching bus masters, the method described above must be modified in such a way that, in addition to the N priority rings, a bus master ring is introduced. Thus, in the case of three priorities, four rings are necessary: three priority rings and one bus master ring. In contrast with the method described above, the ring having the lowest priority behaves analogously to the rings having a higher priority. In this method, the bus master is the ring master of the bus master ring.

It is an advantage of the two above-presented methods that the waiting time for bus allocation of a bus device that has made a high-priority bus request is minimized. One disadvantage of both methods is the possibility of having long waiting times in the case of bus devices that have made a lower-priority bus request, if, at the same time, many high-priority bus requests from other bus devices are pending.

Another arbitration method, which is based on the ring structure, has the advantages of the two methods described above while, at the same time, their disadvantages are reduced.

This arbitration method is characterized by:

N priority rings, which function analogously to those described above, wherein N≧2, a virtual bus device in the priority ring (N−1), which represents the bus devices in the priority ring of the priority N, N being the lowest priority, a virtual bus device in the priority ring (N−2), which represents the bus devices in the priority ring of the priority (N−1), a virtual bus device in the priority ring (N−3), which represents the bus devices in the priority ring of the priority (N−2), etc.

a virtual bus device in the priority ring 1, which represents the bus devices in the priority ring of the priority 2, each virtual bus device of an arbitration ring must give up the bus access right to a bus device of its priority level or a higher priority level whenever a bus device of the ring represented is ready to relinquish the bus, the data bus master is always the ring master of the arbitration ring having the highest priority.

Figure 12:
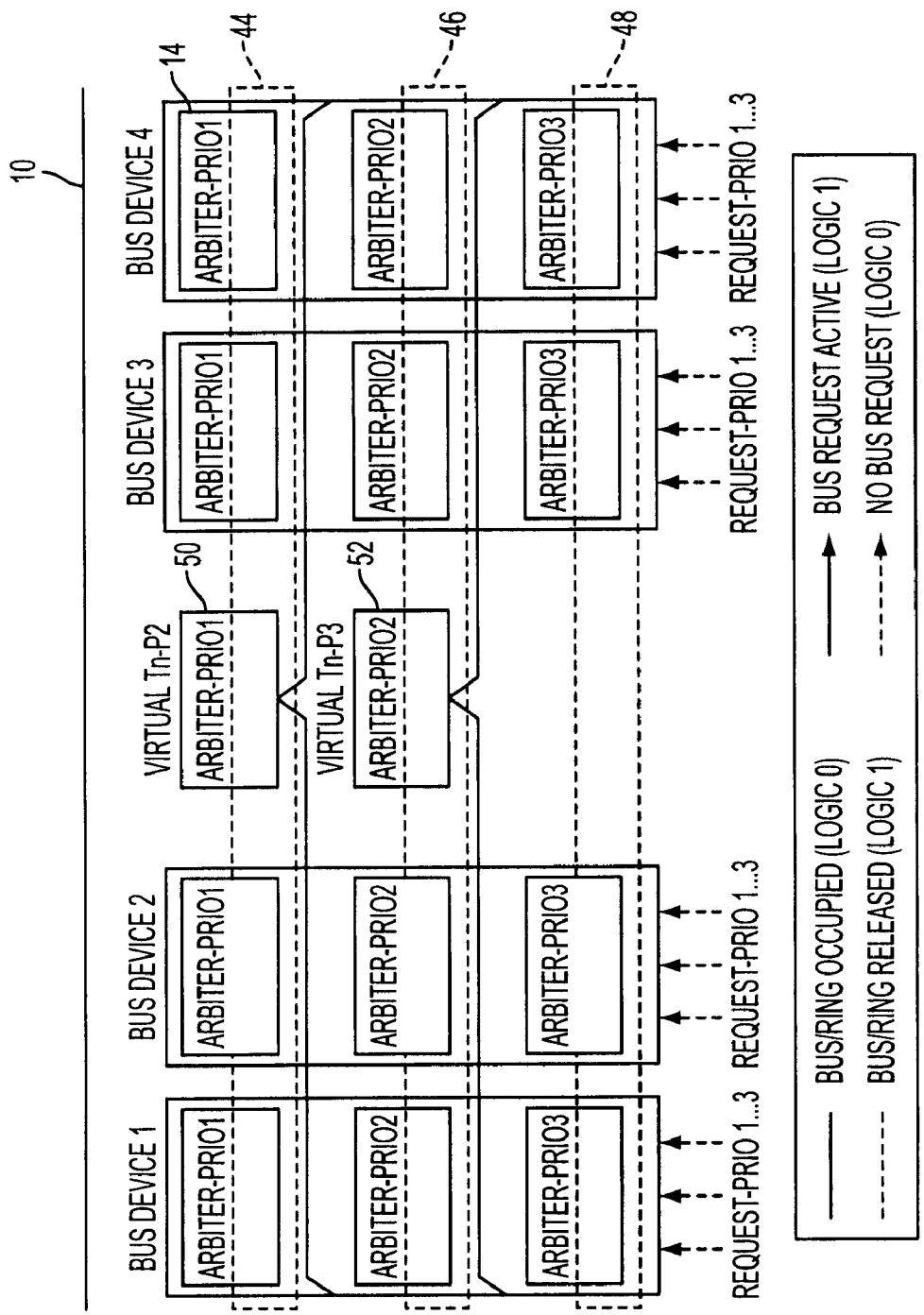
FIG. 12 shows arbitration with three priorities and virtual bus devices after reset, wherein bus device 2 is the bus master.

FIG. 12 shows a block diagram of an exemplary embodiment of such a communication system with an arbitration method, wherein N=3, i.e., for three priorities and three arbitration rings.

The arbitration ring 44 is assigned a priority of 1 and interconnects the arbitration modules 14 of the priority 1 of the bus devices as well as the arbitration module 50 of an arbitration unit, which is, hereinafter, referred to as a virtual bus device. The arbitration module 50 represents the arbitration modules 14 of the priority 2 in the arbitration ring 44 of the priority 1. If, in one of the bus devices, there is a request for access to the data bus having a priority of 2, then this is represented by an access request having a priority of 1 by means of the arbitration module 50 in the arbitration ring 44 of the priority 1.

This situation is similar in the case of the arbitration module 52 in the arbitration ring 46, which represents access requests of the bus devices with a priority of 3 in the arbitration ring 46 of the priority 2.

The data bus master is always the ring master of the arbitration ring having the highest priority. When changing ring masters, the respective timing diagrams of FIGS. 3 through 5 are still applicable for each arbitration ring.

FIG. 12 shows the state after a reset: the bus device 2 is the bus master as long as no bus request is activated.

Figure 13:
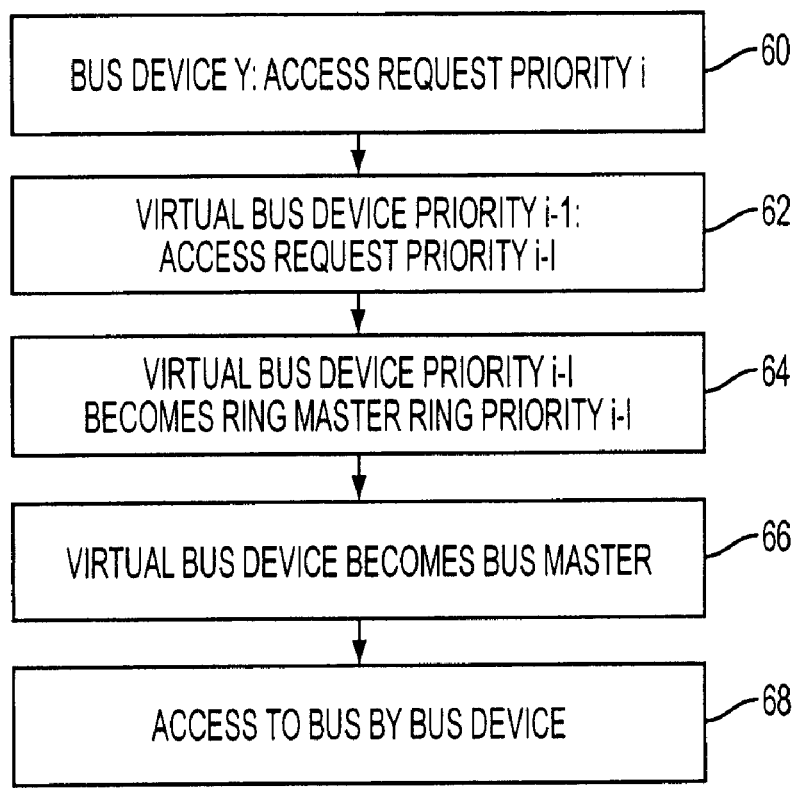
FIG. 13 shows an exemplary embodiment of the method according to the invention with an arbitration unit as a virtual bus device.

FIG. 13 illustrates, based on a flow chart, the operation of a communication system of the type depicted in FIG. 12. In step 60, one of the bus devices Y has an access request to the data bus with a priority i. In step 62, this access request is represented by the virtual bus device of the priority i−1 in the arbitration ring of the priority i−1 through a respective access request of the priority i−1.

In step 64, the virtual bus device of the priority i−1 becomes the ring master in the arbitration ring of the priority i−1. Furthermore, the virtual bus device also becomes the bus master (step 66), so that, in step 68, the bus device Y can access the bus.

Figure 14:
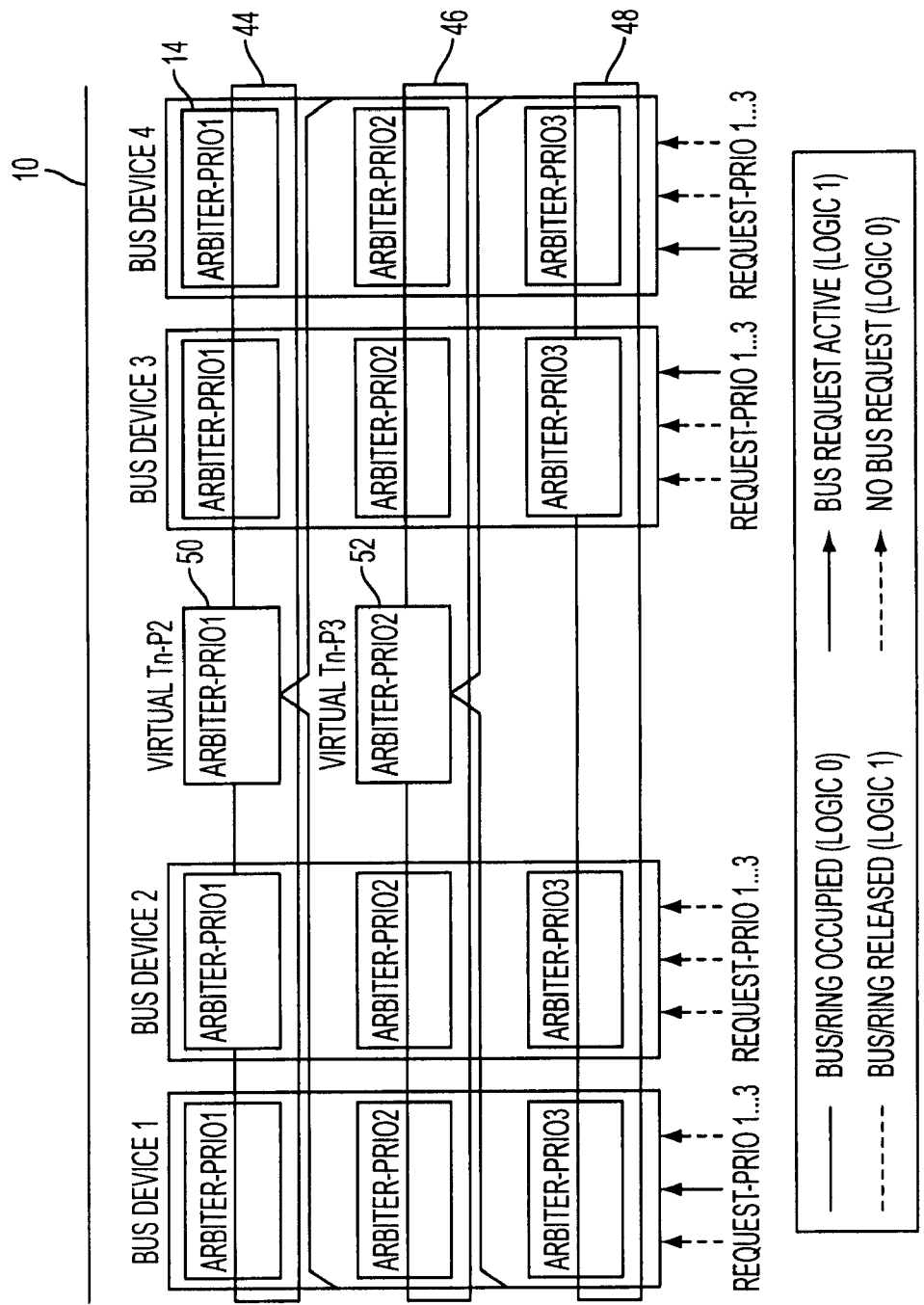
FIG. 14 shows arbitration with three priorities and virtual bus devices, wherein bus devices 1, 3 and 4 activate bus requests of different priorities, and wherein bus device 3 becomes the bus master.

FIG. 14 shows the state of a communication system when, for the time being, the bus device 2 is the old bus master. In the same bus clock pulse, the bus device 3 activates a request of the priority 3, the bus device 1 activates a request of the priority 2, and the bus device 4 activates a request of the priority 1. Thereafter, the bus device 3 becomes the new ring master of the arbitration ring 48 of the priority 3. The virtual bus device having the arbitration module 52 becomes the new ring master of the arbitration ring 46 of the priority 2. The virtual bus device having the arbitration module 50 becomes the new ring master of the arbitration ring 44 of the priority 1 and the bus device 3 finally gains access to the data bus 10.

Figure 15:
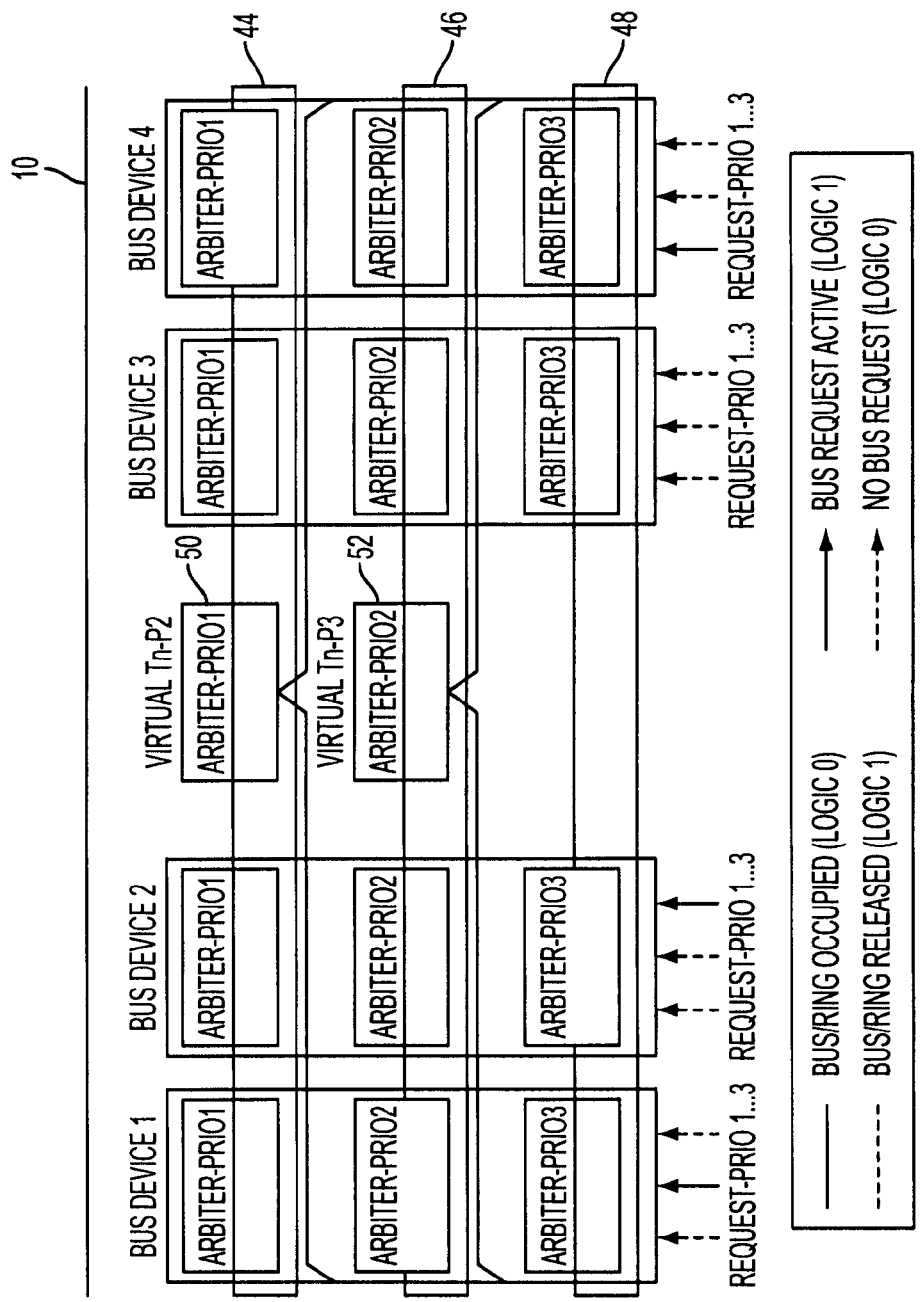
FIG. 15 shows arbitration with three priorities and virtual bus devices, wherein bus device 2 activates the bus request, wherein bus device 3 deactivates the bus request, and wherein bus device 4 becomes the bus master.

FIG. 15 shows the bus device 3 as the current bus master. The bus device 2 activates a request of the priority 3.

Thus, the following bus requests are active when the current bus master, i.e., the bus device 3, is ready for changing bus masters:

bus device 2: request of the priority 3 is active;
bus device 1: request of the priority 2 is active;
bus device 4: request of the priority 1 is active.
    bus device 2 becomes the new ring master of the arbitration ring of the priority 3;
    bus device 1 becomes the new ring master of the arbitration ring of the priority 2;
    bus device 4 becomes the new ring master of the arbitration ring of the priority 1;
    bus device 4 becomes the new data bus master.

Figure 16:
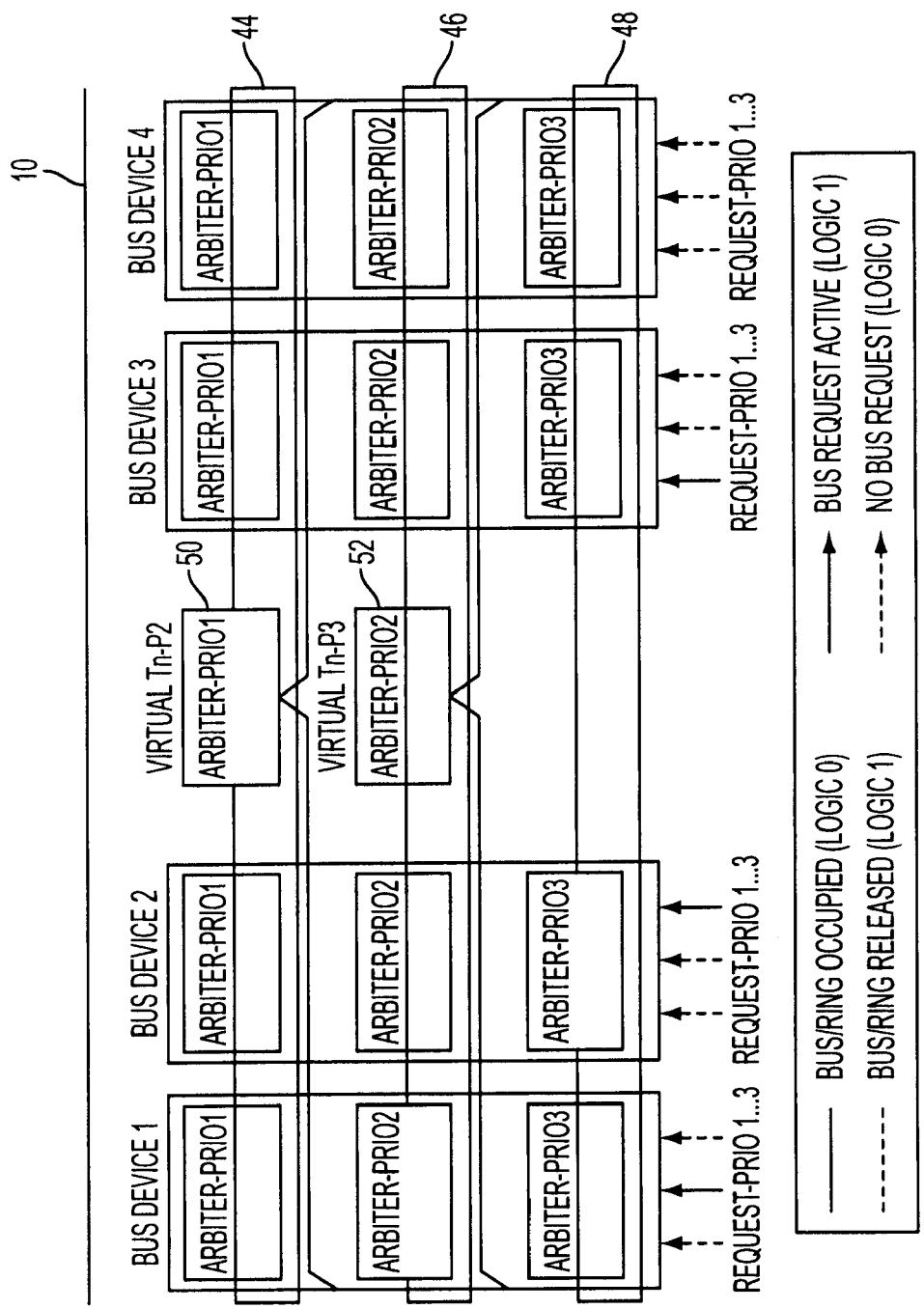
FIG. 16 shows arbitration with three priorities and virtual bus devices, wherein bus device 3 activates the bus request, wherein bus device 4 deactivates the bus request, and wherein bus device 1 becomes the bus master.

In FIG. 16, the bus device 4 is the current bus master and the bus device 3 activates a request of the priority 1. Thus, the following bus requests are active when the current bus master, i.e., the bus device 4, is ready for changing bus masters:

bus device 2: request of the priority 3 is active;
bus device 1: request of the priority 2 is active;
bus device 3: request of the priority 1 is active.
    bus device 2 remains the ring master of the arbitration ring of the priority 3;
    bus device 1 remains the ring master of the arbitration ring of the priority 2;
    virtual bus device P2 becomes the new ring master of the arbitration ring of the priority 1;
    bus device 1 becomes the new data bus master.

Figure 17:
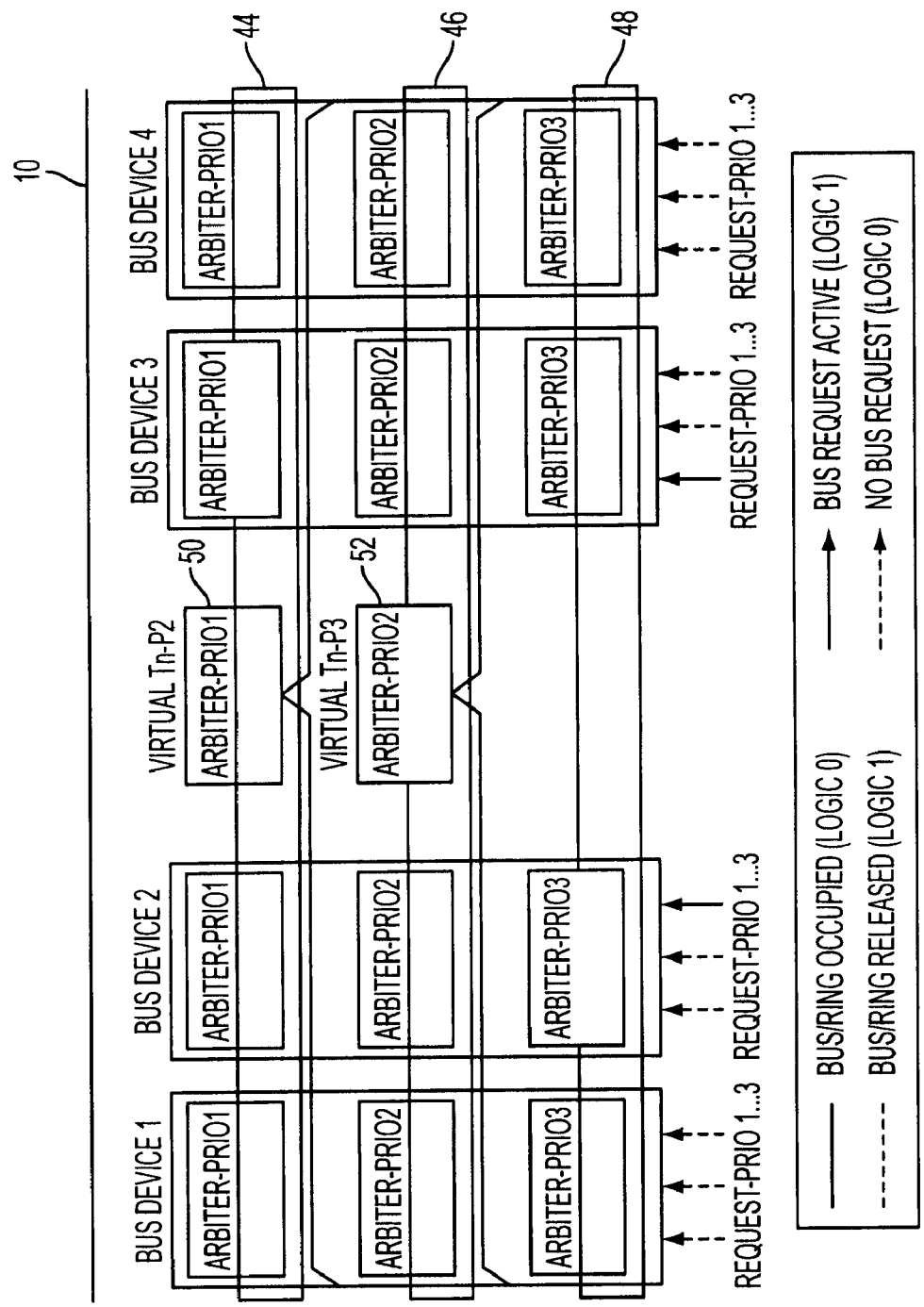
FIG. 17 shows arbitration with three priorities and virtual bus devices, wherein bus device 1 deactivates the bus request, and wherein bus device 3 becomes the bus master.

In FIG. 17, the bus device 1 is the current bus master:

Thus the following bus requests are active when the current bus master, i.e., the bus device 1, is ready for changing bus masters:

bus device 2: request of the priority 3 is active;
bus device 3: request of the priority 1 is active.
    the bus device 2 remains the ring master of the arbitration ring of the priority 3;
    the virtual bus device P3 becomes the new ring master of the arbitration ring of the priority 2;
    the bus device 3 becomes the new ring master of the arbitration ring of the priority 1;
    the bus device 3 becomes the new data bus master.

Figure 18:
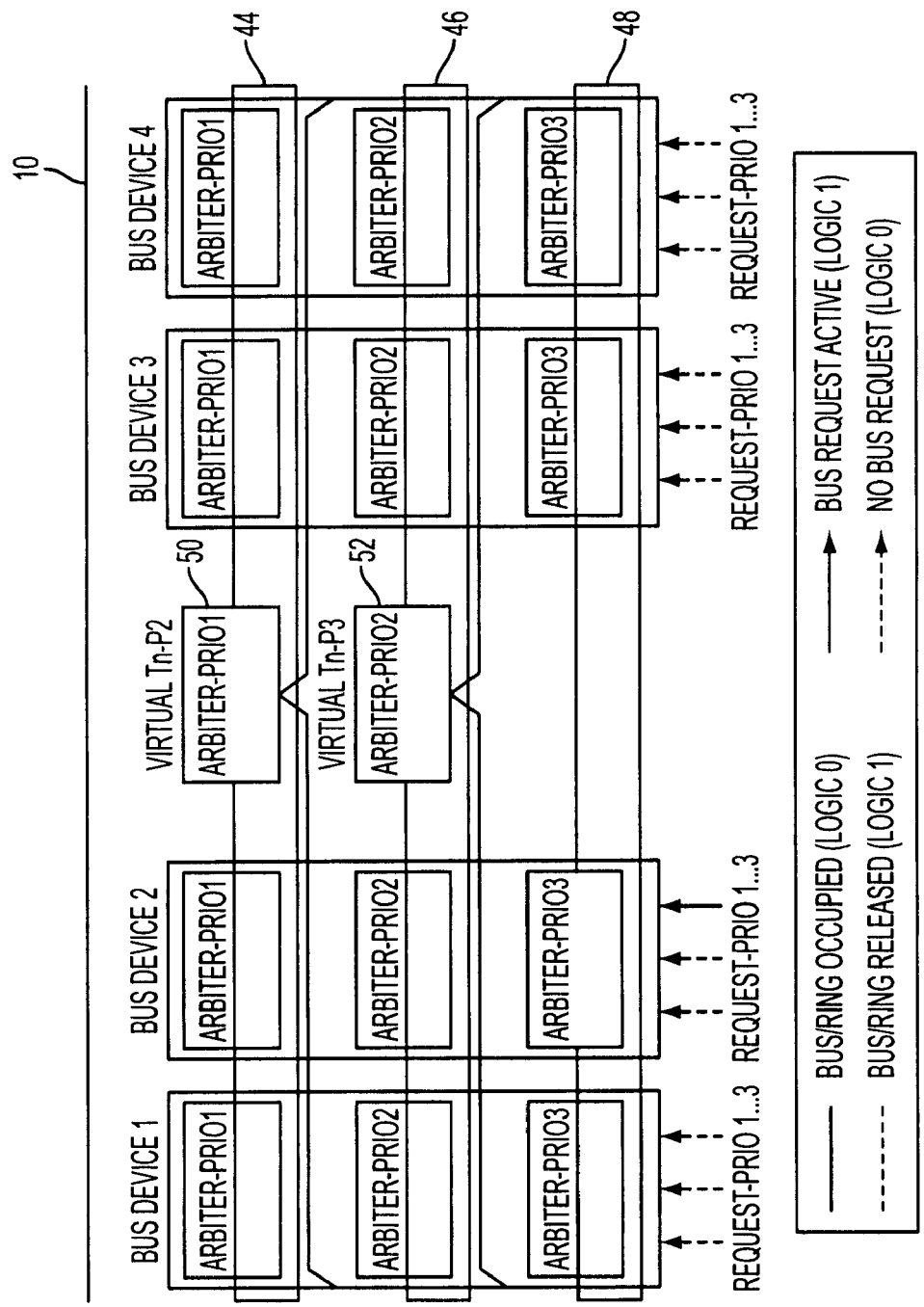
FIG. 18 shows arbitration with three priorities and virtual bus devices, wherein bus device 3 deactivates the bus request, and wherein bus device 2 becomes the bus master.

In FIG. 18, the bus device 3 is the current bus master:

Thus, the following bus requests are active when the current bus master, i.e., the bus device 3, is ready for changing bus masters:

bus device 2: the request of the priority 3 is active;
    the bus device 2 remains the ring master of the arbitration ring of the priority 3;
    the virtual bus device P3 remains the ring master of the arbitration ring of the priority 2;
    the virtual bus device P2 becomes the new ring master of the arbitration ring of the priority 1;
    the bus device 2 becomes the new data bus master.

Figure 19:
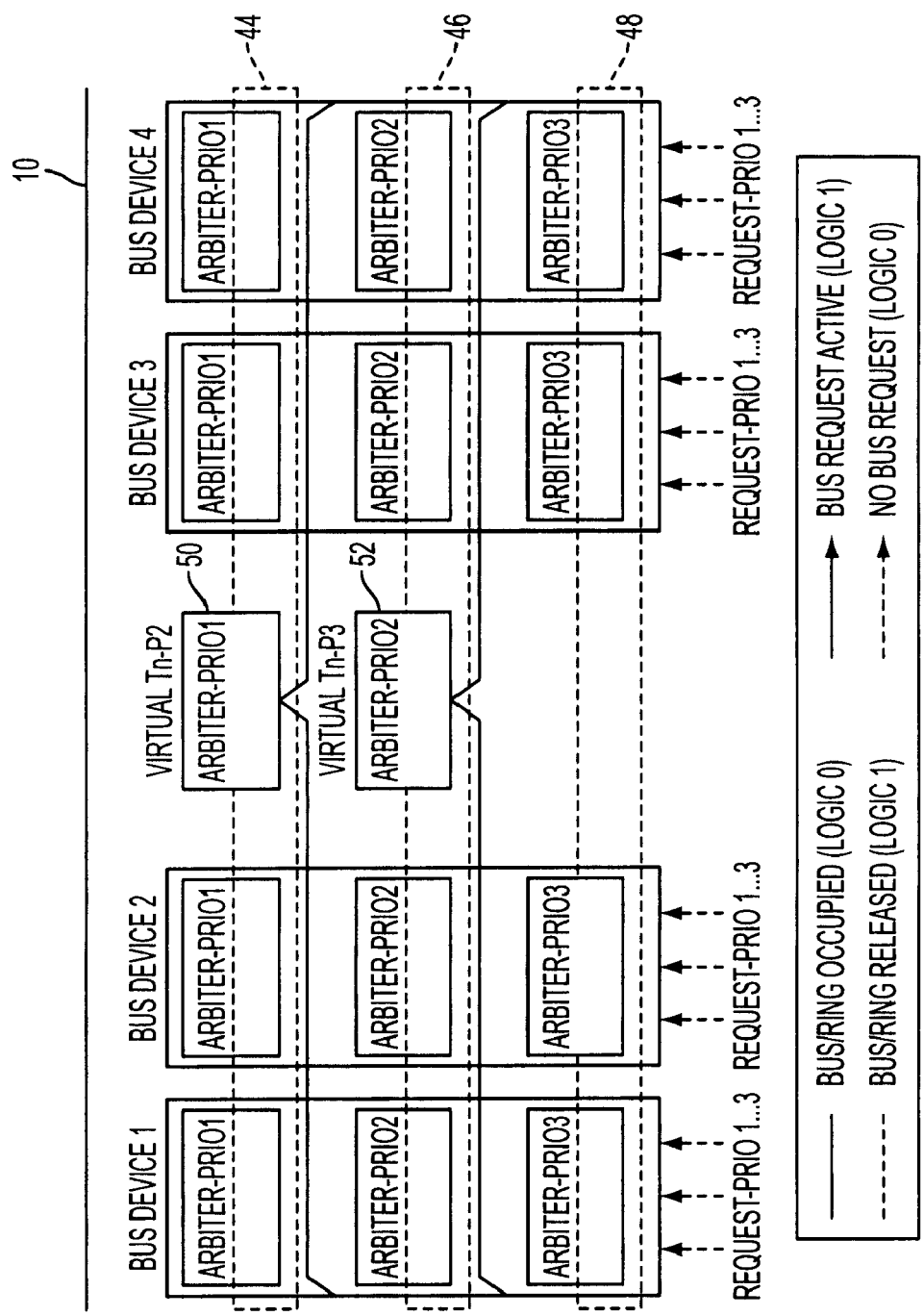
FIG. 19 shows arbitration with three priorities and virtual bus devices, wherein bus device 2 deactivates the bus request and remains the bus master.

In FIG. 19, the bus device 2 is the current bus master:

Thus, no bus requests are active when the current bus master, i.e., the bus device 3, is ready for changing bus masters:

the bus device 2 remains the ring master of the arbitration ring of the priority 3;
    the virtual bus device P3 remains the ring master of the arbitration ring of the priority 2;

the virtual bus device P2 remains the ring master of the arbitration ring of the priority 1;

the bus device 2 remains the data bus master until another bus device activates a bus request.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method of arbitrating access to a data bus among bus devices, wherein the bus devices are linked by a plurality of arbitration rings, comprising:
   a) requesting access by a first one of the bus devices;
   b) checking whether a first signal, which indicates that one of the arbitration rings is enabled, is applied to an input of the first one of the bus devices;
   c) if the first signal is applied, outputting a second signal by the first one of the bus devices;
   d) checking whether, at the end of a predetermined time interval, the first signal is still applied at the input of the first one of the bus devices; and
   e) if the first signal is still applied at the end of the predetermined time interval, accessing the data bus by the first one of the bus devices;
   wherein a respective priority is assigned to each of the arbitration rings.

2. The method as claimed in claim 1,
   wherein step a) is performed with a first priority;
   wherein, in step b), the one of the arbitration rings is assigned to the first priority;
   wherein, in step c), the second signal is output on the one of the arbitration rings that is assigned to the first priority; and
   wherein the method further comprises:
      checking whether the second signal is applied at an input of a respective bus device for an arbitration ring that has the lowest priority or for an arbitration ring that has a priority that is higher than the first priority;
      outputting the second signal on the arbitration ring that has the lowest priority; and
      accessing the data bus by the first one of the bus devices.

3. The method as claimed in claim 2, further comprising representing, by a virtual bus device, access requests of the bus devices of a second priority in an arbitration ring that is assigned a higher, third priority.

4. The method as claimed in claim 1, wherein the predetermined time interval is a bus clock pulse of the data bus.

5. A bus device for accessing a data bus and for coupling to a plurality of arbitration rings, wherein a priority is assigned to each arbitration ring, comprising:
   a) a requestor configured to request access to the data bus;
   b) a first checker configured to check whether a first signal, which indicates that one of the arbitration rings is enabled, is applied to an input of a first one of the bus devices;
   c) a first output device configured to output a second signal by the first one of the bus devices, if the first signal is applied;
   d) a second checker configured to check whether, at the end of a predetermined time interval, the first signal is still applied at the input of the first one of the bus devices; and
   e) an access device configured to access the data bus by the first one of the bus devices, if the first signal is still applied at the end of the predetermined time interval.

6. The bus device as claimed in claim 5,
   wherein the requester is configured to request the access by the first one of the bus devices with a first priority;
   wherein the one of the arbitration rings is assigned to the first priority;
   wherein the first output device is configured to output the second signal on the one of the arbitration rings that is assigned to the first priority; and
   wherein the bus device further comprises:
      a third checker configured to check whether the second signal is applied at an input of a respective bus device for an arbitration ring that has the lowest priority or for an arbitration ring that has a priority higher than the first priority; and
      a second output device configured to output the second signal on the arbitration ring that has the lowest priority.

7. The bus device as claimed in claim 5, further comprising an representing device configured to represent access requests by the bus devices of a second priority in an arbitration ring that is assigned a higher, third priority.

8. The bus device as claimed in claim 5, wherein the predetermined time interval is a bus clock pulse of the data bus.

9. A communication system, comprising:
   a plurality of bus devices; and
   at least one arbitration ring to couple the bus devices;
   wherein each of the bus devices comprises:
      a) a requestor configured to request access to a data bus;
      b) a first checker configured to check whether a first signal, which indicates that one of the arbitration rings is enabled, is applied to an input of a first one of the bus devices;
      c) an output device configured to output a second signal by the first one of the bus devices, if the first signal is applied;
      d) a second checker configured to check whether, at the end of a predetermined time interval, the first signal is still applied at the input of the first one of the bus devices; and
      e) an access device configured to access the data bus by the first one of the bus devices, if the first signal is still applied at the end of the predetermined time interval.

* * * * *